United States Patent
Kotani et al.

(10) Patent No.: US 7,325,247 B2
(45) Date of Patent: Jan. 29, 2008

(54) INFORMATION MANAGEMENT METHOD USING A RECORDING MEDIUM WITH A SECURE AREA AND A USER-USE AREA

(75) Inventors: Seigo Kotani, Kawasaki (JP); Takayuki Hasebe, Kawasaki (JP); Hideyuki Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 09/800,505

(22) Filed: Mar. 8, 2001

(65) Prior Publication Data

US 2001/0008016 A1    Jul. 12, 2001

Related U.S. Application Data

(63) Continuation of application No. PCT/JP99/03421, filed on Jun. 24, 1999.

(30) Foreign Application Priority Data

Sep. 18, 1998 (JP) ................... 10-265210

(51) Int. Cl.
- G06F 15/16 (2006.01)
- G06F 17/30 (2006.01)
- G06F 7/04 (2006.01)
- G06F 7/58 (2006.01)
- H04L 9/32 (2006.01)
- G06K 9/00 (2006.01)
- H03M 1/68 (2006.01)
- H04K 1/00 (2006.01)

(52) U.S. Cl. ............. 726/6; 726/26; 713/193; 705/51; 705/54; 705/55; 705/56; 705/57; 705/59

(58) Field of Classification Search ........... 713/193, 713/200; 705/59, 51, 54–57; 380/284–285; 726/6, 26

See application file for complete search history.

(56) References Cited

U.S. PATENT DOCUMENTS

| | | | | |
|---|---|---|---|---|
| 5,191,611 A | * | 3/1993 | Lang | 705/53 |
| 5,392,351 A | * | 2/1995 | Hasebe et al. | 705/51 |
| 5,590,199 A | * | 12/1996 | Krajewski et al. | 713/159 |
| 5,796,824 A | * | 8/1998 | Hasebe et al. | 705/51 |
| 5,818,812 A | * | 10/1998 | Moribe et al. | 369/47.15 |

(Continued)

FOREIGN PATENT DOCUMENTS

| | | |
|---|---|---|
| EP | 0 138 386 | 4/1985 |
| EP | 936530 A1 * | 8/1999 |
| GB | 2284689 A * | 6/1995 |
| JP | 60-62252 | 4/1985 |
| JP | 5-257816 | 10/1993 |

(Continued)

OTHER PUBLICATIONS

Kaplan, Marc A. "IBM Cryptolopes, SuperDistribution and Digital Rights Management", Dec. 1996 IBM (http://www.research.ibm.com/people/k/kaplan).*

Schneier, Bruce. Applied Cryptography, Second Edition. John Wiley & Sons, Inc. 1996, pp. 31-32.*

Primary Examiner—Rambiz Zand
Assistant Examiner—Michael J Simitoski
(74) Attorney, Agent, or Firm—Staas & Halsey LLP

(57) ABSTRACT

An information management method restoring electronic data using backup information upon the loss of electronic data stored on a recording medium. Information stored in a predetermined area of the recording medium having medium-specific information is encrypted using medium-specific information or a key generated therefrom and is derived outside the predetermined area.

22 Claims, 11 Drawing Sheets

U.S. PATENT DOCUMENTS

| | | | | |
|---|---|---|---|---|
| 5,886,979 A | * | 3/1999 | Moribe et al. | 369/47.12 |
| 5,892,900 A | * | 4/1999 | Ginter et al. | 713/200 |
| 5,905,798 A | * | 5/1999 | Nerlikar et al. | 705/57 |
| 6,198,875 B1 | * | 3/2001 | Edenson et al. | 386/94 |
| 6,351,813 B1 | * | 2/2002 | Mooney et al. | 713/185 |
| 6,810,479 B1 | * | 10/2004 | Barlow et al. | 713/185 |
| 2001/0032088 A1 | * | 10/2001 | Utsumi et al. | 705/1 |
| 2001/0042043 A1 | * | 11/2001 | Shear et al. | 705/51 |
| 2002/0016919 A1 | * | 2/2002 | Sims, III | 713/193 |
| 2002/0080190 A1 | * | 6/2002 | Hamann et al. | 345/810 |

FOREIGN PATENT DOCUMENTS

| | | | | |
|---|---|---|---|---|
| JP | 06092871 A | * | 4/1994 | |
| JP | 9-171619 | | 6/1997 | |
| JP | 9-190667 | | 7/1997 | |
| JP | 10149283 A | * | 6/1998 | |
| JP | 2000305850 A | * | 11/2000 | |
| JP | 2000307569 A | * | 11/2000 | |
| JP | 2000315175 A | * | 11/2000 | |

* cited by examiner

INFORMATION MANAGEMENT METHOD USING A RECORDING MEDIUM WITH A SECURE AREA AND A USER-USE AREA

This is a continuation of International Application PCT/JP99/03421, with an international filing date of Jun. 24, 1999.

TECHNICAL FIELD

The present invention relates to an information management method and an information management apparatus. More specifically, it relates to an information management method and an information management apparatus used when recording and reading out information on a recording medium having medium-specific information.

BACKGROUND ART

Software such as computer programs and the like and electronic publications are sold as electronic data stored on magneto-optical-disks (MO), digital video disks (DVD), floppy diskettes (FD), mini-disks (MD) and other types of recording media. Because this type of electronic data is generally easy to copy, unauthorized copies are frequently made. This leads to infringements of the copyrights of software vendors and electronic publishers, who may as a result suffer losses.

In order to protect the electronic data stored on these types of recording medium, it has been proposed that user-specific information be used to generate encrypted license information, which is stored in a predetermined area on the recording medium, and in this state the recording media is distributed. Electronic data such as software and publications are encrypted using a predetermined encryption key and stored on the recording medium. Further, a decryption key for decrypting the encrypted electronic data is encrypted using user-specific information, and is stored on the recording medium as license information.

A user can obtain the decryption key by decrypting this license information using user-specific information, and can use this decryption key to decrypt and thereby make use of the encrypted electronic data stored on the recording medium.

Through the use of this sort of constitution, when use rights for electronic data are granted to individual users, a common encryption key for encrypting the electronic data can be used, and by encrypting a decryption key using user-specific information that is different for each user, use rights can be granted individually.

User-specific information used in these methods can be, for example, an apparatus number given to the computer or recording medium-driving apparatus that the user is using. Thus these methods have the drawbacks of preventing the user from using the medium in a different apparatus or from transferring the recording medium to another party, even if the user had acquired the recording medium in a proper manner.

Japanese Laid-open patent 5-257816 proposes a method whereby medium-specific information is assigned to a recording medium, and a decryption key for decrypting encrypted electronic data is encrypted using this medium-specific information and stored on the recording medium.

As in the methods described above, in this method too a common encryption key for encrypting the electronic data can be used, and by encrypting a decryption key using medium-specific information that is different for each user, use rights can be granted individually.

In the above-described methods, encrypted electronic data is stored in an area that a user can access, and the license information for use of this electronic data is stored in a secure area that a user cannot access. Therefore, even a rightful user cannot read out this license information and make a backup, so if for whatever reason the data stored in this secure area is lost, the user cannot use the electronic data. In such cases, the user needs to have reissue of the use rights from a data administrator such as the software vendor or publisher, or an agent thereof. Thus to get the rights reissued involves extra effort and expense.

It is an object of the present invention to provide an information management method and information management apparatus wherein a user, even when the license information necessary for using electronic data stored on a recording medium is lost for whatever reason, can use backup information to restore this lost license information.

DISCLOSURE OF THE INVENTION

In the information management method of the present invention, predetermined information stored in a predetermined area on a recording medium having medium-specific information is encrypted using medium-specific information or a key generated therefrom, and is derived outside a predetermined area.

This information management method can be constituted so that the recording medium contains a first area storing predetermined information and a second area different from the first.

Further, this information management method can be constituted so that the second area is a user-use area to which any information can be written and from which any information can be read out in accordance with instructions from an external source, and the first area is a secure area that cannot be controlled by instructions from an external source.

In such a case, the information management method can be constituted so that the any information stored in the second area is encrypted electronic data and the predetermined information stored in the first area includes license information based on use rights for using the electronic data.

Further, the information management method can be constituted so that the predetermined information is encrypted based on medium-specific information or a key generated therefrom and stored in a predetermined area.

In addition, the predetermined information may be encrypted based on information specific to the apparatus that drives the recording medium.

Further, the information management method can be constituted so that the encrypted predetermined information is stored in the second area.

In such a case, the information management method can be constituted so that the encrypted predetermined information stored in the second area is decrypted using medium-specific information or a key generated therefrom, and the predetermined information stored in the first area is updated.

Further, the information management method can be constituted so that when the predetermined information is to be derived outside the first area, it is encrypted by medium-specific information or a key generated therefrom, and by information specific to the apparatus that drives the recording medium or a key generated therefrom.

In such a case, the information management method can be constituted so that the encrypted predetermined information stored in the second area is decrypted by information specific to the apparatus that drives the recording medium or a key generated therefrom, and medium-specific information or a key generated therefrom, and the predetermined information stored in the first area is updated.

By means of such constitution as described above, when predetermined information is derived outside the predetermined area in which it is stored, it is encrypted using information specific to this medium; therefore, it is difficult to decrypt this information, even if it has been copied to a different medium. For example, if, when software or publications and the like are stored in a second area, this electronic data is stored after having been encrypted using an encryption key, and the decryption key for decrypting this is encrypted by information specific to this medium and stored in a first area to which a user has no access, there is no need to change the encryption key for encryption for each individual user, and a common encryption key can be used for encryption and stored. Because the encrypted decryption key stored in the first area is further encrypted using medium-specific information and then derived outside the first area, a user can make and save a backup copy. Because this saved backup data has been encrypted using medium-specific information, it is difficult to decrypt even if copied onto another medium, and thus it is difficult to obtain the decryption key for decrypting the electronic data.

Further, even if the information stored in the predetermined area is lost, a user can restore the license information using this backup data, and can thus avoid the trouble of having the use rights reissued.

Further, the information management method can be constituted so that the encrypted predetermined information is stored on a second recording medium different from the recording medium.

In such a case, the information management method can be constituted so that encrypted predetermined information stored on the second recording medium is decrypted by medium-specific information or a key generated therefrom, and predetermined information stored in a predetermined area is updated.

Further, the information management method can be constituted so that when predetermined information is derived on a second recording medium, it is encrypted by medium-specific information or a key generated therefrom and information specific to an apparatus that drives the second recording medium or a key generated therefrom.

In such a case, the information management method can be constituted so that the encrypted predetermined information stored on the second recording medium is decrypted by information specific to an apparatus that drives the second recording medium or a key generated therefrom and medium-specific information or a key generated therefrom, and predetermined information stored in a predetermined area is updated.

Also, it is preferable that it be possible to obtain medium-specific information electronically from a recording medium and that it be visually displayed on the recording medium, and it is preferable that it be possible to obtain information specific to the apparatus that drives the recording medium and the information specific to the apparatus that drives the second recording medium and that they be visually displayed on the devices.

In such a case, when the above-described backup data for license information has been saved on the second recording medium, and the data stored in the first area has been lost, this lost data can be restored based on the information stored on this second recording medium.

The information management apparatus according to an aspect of the present invention manages information of a recording medium. The recording medium has medium-specific information and comprises a user-use area to which any information can be written and from which any information can be read out in accordance with instructions from an external source, and a secure area that cannot be controlled by instructions from an external sources. The information management apparatus manages information of a recording medium wherein license information based on use rights for any information stored in a user-use area is stored in a secure area, said information management apparatus further comprising write and read-out means for writing any information to and reading out any information from the user-use area and predetermined information deriving means for encrypting license information stored in the secure area using medium-specific information or a key generated therefrom and deriving the same outside the secure area.

The information management apparatus may be so constituted that the encrypted license information is stored by the write and read-out means in the user-use area.

Further, the information management apparatus may be constituted so that it further comprises predetermined information update means that decrypts the encrypted license information stored in the user-use area using medium-specific information and updates the license information stored in the secure area.

Also, the information management apparatus may be constituted so that it comprises apparatus-specific information, and the predetermined information deriving means encrypts the license information using medium-specific information or a key generated therefrom and information specific to the apparatus or a key generated therefrom.

In such a case, the information management apparatus may be constituted so that it further comprises predetermined information update means that decrypts encrypted license information stored in a user-use area using information specific to the apparatus or a key generated therefrom and medium-specific information and updates license information stored in the secure area.

Further, the information management apparatus may be constituted so that it transmits encrypted license information to a second recording medium different from the recording medium.

In such a case, the information management apparatus may be constituted so that it further comprises predetermined information update means that decrypts encrypted license information stored on the second recording medium and updates license information stored in the secure area.

Further, the information management apparatus may be constituted so that an apparatus that drives the second recording medium contains apparatus-specific information, and predetermined information deriving means encrypts license information using medium-specific information or a key generated therefrom and information specific to the apparatus that drives the second recording medium or a key generated therefrom.

In such a case, the information management apparatus may be constituted so that it further comprises predetermined information update means that decrypts encrypted license information stored on the second recording medium using information specific to the apparatus that drives the second recording medium or a key generated therefrom and medium-specific information and updates license information stored in the secure area.

BEST MODE FOR IMPLEMENTING THE INVENTION

Embodiments of the present invention will be explaining while referring to the figures.

Recording Medium

Figure 1:
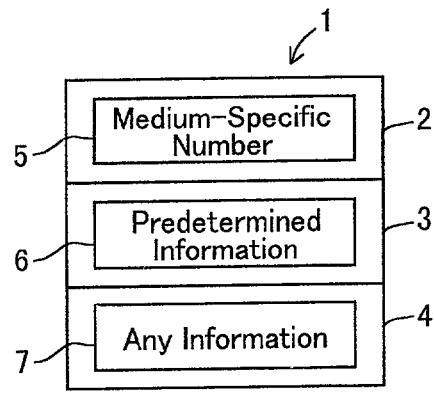
FIG. 1 is a conceptual view showing the recording of a recording medium used in the present invention.

The recording medium used in the present invention can be a magneto-optical disk, a DVD, a floppy disk, a minidisk, or other recording medium such that a user can rewrite data; as an example, FIG. 1 will be used to explain the recording area of a magneto-optical disk.

A recording medium 1 has a first layer 2 allowing read out but not rewrite by a user, a second layer 3 not allowing read out and writing according to external instructions, and a third layer 4 allowing a user to write any information. A medium-specific number 5 decided exclusively for that medium is stored in the first layer 2. The third layer 4 is an area wherein a user can store any information 7; it is a user contents area that stores computer programs, electronic publications, and other data for a user to use. The second layer 3 is an area for storing predetermined information 6 which is based on any information stored in the third layer 4; for example, license information and the like based on use rights for computer programs and electronic publications and the like stored in the third layer 4 are stored therein.

Constitution of the Licensing Side

When electronic data is stored in a recording medium and distributed, this electronic data is encrypted and stored in the recording medium if use rights for the use of this electronic data are established separately for each user.

Figure 2:
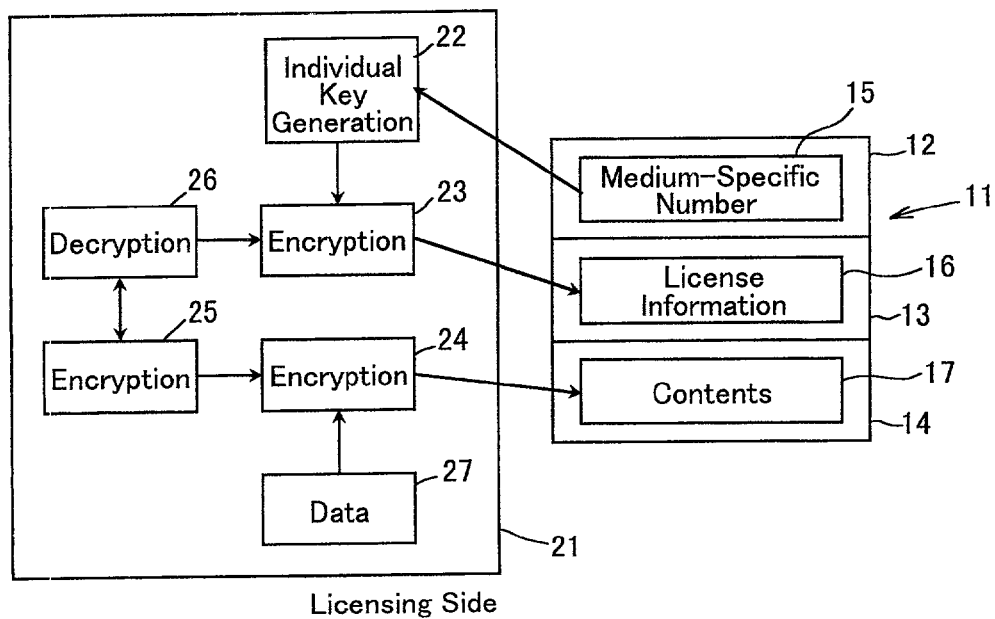
FIG. 2 is a simplified block diagram of the licensing side.
Figure 3:
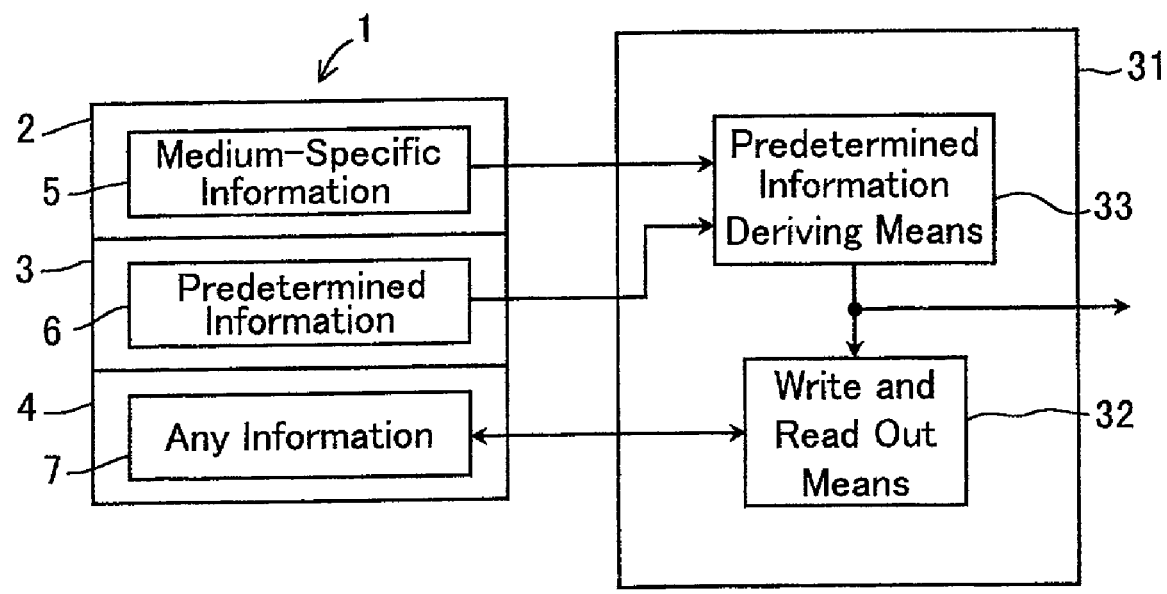
FIG. 3 is a block diagram for illustrating the present invention.

For example, as shown in FIG. 2, when electronic data is stored in a recording medium 11, a medium-specific number 15 is stored in a first layer 12, license information 16 based on use rights is stored in a second layer 13, and encrypted contents 17 are stored in a third layer 14. The license information 16 is data based on a user's use rights; they may be, for example, a decryption key for decrypting encrypted contents 17.

A licensing side computer 21 comprises individual key generating means 22, license information encrypting means 23, contents encrypting means 24, encryption key table 25, and decryption key table 26.

Contents encrypting means 24 encrypts data 27 that will form the contents using an encryption key of the encryption key table 25, and this is stored in the third layer 14 of the recording medium 11 as contents. A decryption key corresponding to the encryption key of the encryption key table 25 is stored in the decryption key table 26. Individual key generating means 22 generates a medium individual key based on the medium-specific number 15 read out from the first layer 12 of the recording medium 11. License information encrypting means 23 encrypts the decryption key of the decryption key table 26 using the medium individual key, and stores this as the license information 16 in the second layer 13 of the recording medium

User Side Constitution

Figure 4:
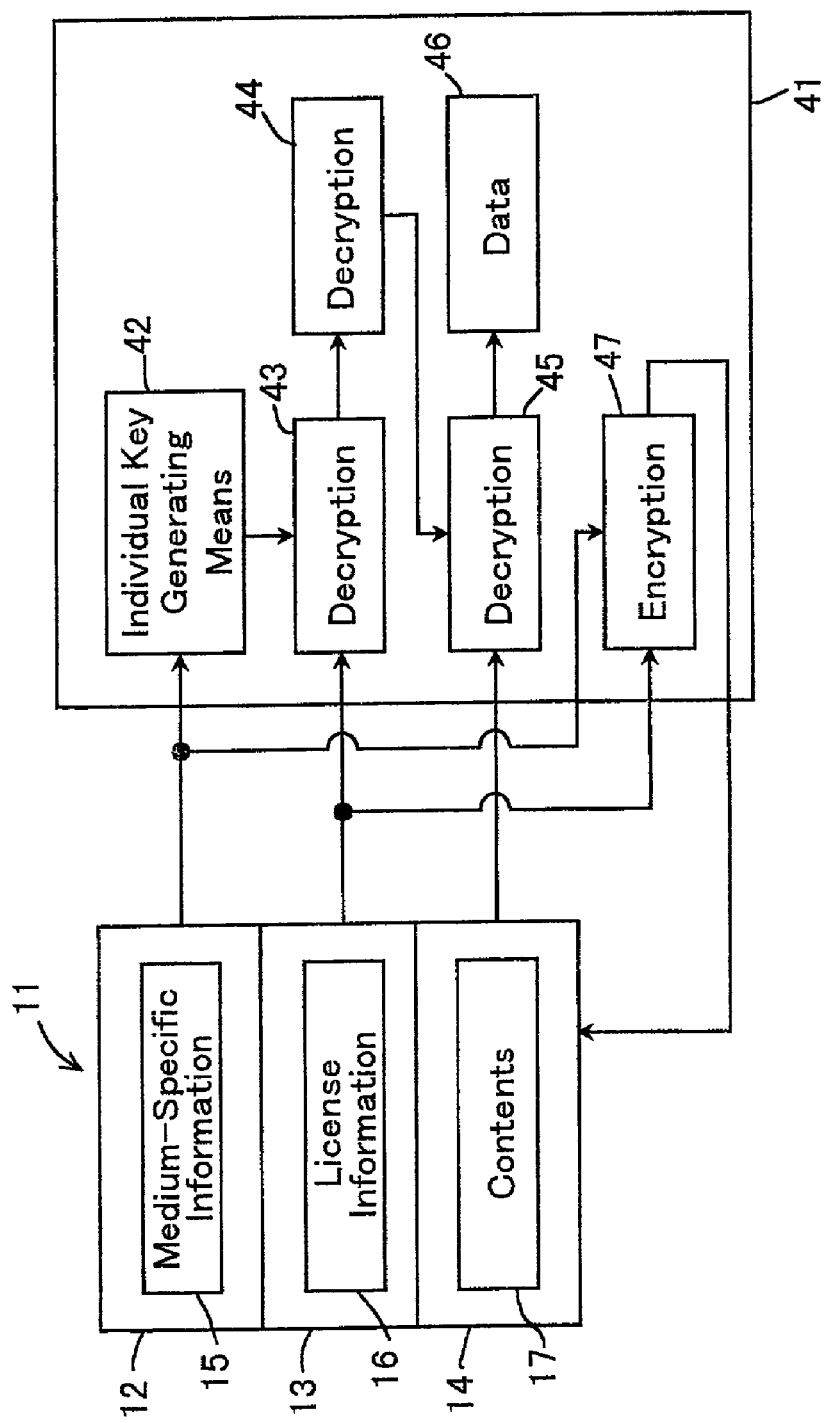
FIG. 4 is a simplified block diagram of a first embodiment.

A conceptual illustration of the user-side apparatus for driving the recording medium of FIG. 1 is shown in FIG. 4.

A drive apparatus 31 comprises write and read out means 32 for writing any information 7 to and reading said information out from the third layer 3, which is a user-use layer, and predetermined information deriving means 33 for encrypting predetermined information 6 stored in the second layer 3, which is a secure area, using the medium-specific number 5 stored in the first layer 2, and deriving it in an area outside the second layer 3. Places where predetermined information deriving means 33 may encrypt and derive predetermined information such as license information include, for example, the third layer 4 or another recording medium. When encrypted license information is stored in the third layer 4 of the recording medium, it can be stored by write and read out means 32 as any information 7.

A simplified block diagram is shown in FIG. 4 as an example of a more detailed constitution.

A user side drive apparatus 41 comprises individual key generation means 42, license information decrypting means 43, a decryption key storage unit 44, contents decryption means 45, a decryption data storage unit 46, and license information encrypting means 47.

Individual key generation means 42 generates a medium individual key based on the medium-specific number 15 stored in the first layer 12 of recording medium 11; what it generates is the same as individual key generated by individual key generating means 22 on the licensing side. License information decrypting means 43 reads out the license information 16 stored in the second layer 13 of the recording medium 11, and decrypts this using the individual key generated by individual key generation means 42. The license information decrypted by license information decrypting means 43 is temporarily stored in the decryption key storage unit 44. Contents decryption means 45 reads out the contents 17 stored in the third layer 14 of the recording medium 11, decrypts this using the decryption key stored in the decryption key storage unit 44 and stores it in the decryption data storage unit 46.

License information encrypting means 47 reads out the license information 16 of the second layer 13, and encrypts it using the medium-specific number 15 stored in the first layer 12. In such a case, the medium-specific number 15 may be used as is, it may be encrypted using an individual key generated by individual key generation means 42, and it may be encrypted using an encryption key generated from the medium-specific number 15. Thereafter, the encrypted license information is stored in the third layer 14 of the recording medium 11.

Contents Storage Processing

Figure 5:
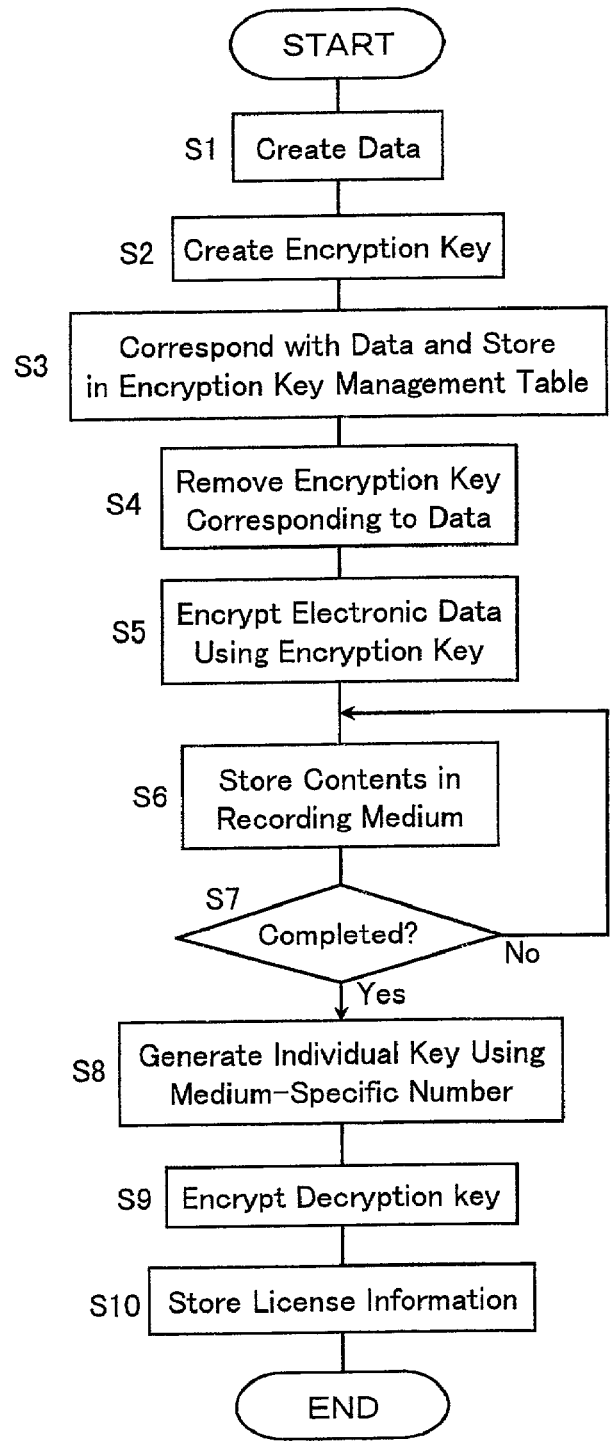
FIG. 5 is a control flow chart of the contents storage processing.

Operations when the licensing side stores electronic data in the recording medium 11 are shown in FIG. 5 as a flow chart.

In Step S1, a computer program, electronic publication or other electronic data to be stored in the recording medium 11 is created. In Step S2, an encryption key for encrypting the electronic data is created. In Step S3, the electronic data to be encrypted and the encryption key are corresponded and stored in the encryption key table 25. Simultaneously with this, a decryption key for decrypting data encrypted by the encryption key is created, and the electronic data and the decryption key are corresponded and stored in the decryption key table 26. A key can serve as both encryption key and decryption key, and the encryption key table 25 and the decryption key table 26 may be combined into a single key management table.

In Step S4, the encryption key corresponded with the electronic data to be encrypted is removed from the encryption key table 25. In Step S5, the electronic data is encrypted by the encryption key. For example, when using DES encryption, substitution and bit transposition is conducted repeatedly on the electronic data to be encrypted. In Step S6, the encrypted electronic data is stored as the contents 17 in the third layer 14 of the recording medium 11. In Step S7, it is determined whether or not the storage of the encrypted electronic data has been completed. If the storage of the encrypted electronic data has been fully completed, then control proceeds to Step S8.

In Step S8, the medium-specific number 15 is read out from the first layer 12 of the recording medium 11 and an individual key is generated. In Step S9, the decryption key corresponding to the electronic data stored as the contents 17 in the recording medium 11 is read out from the decryption key table 26 and is encrypted by the individual key generated in Step S8. After the decryption key corresponding to the electronic data stored as the contents 17 is fully encrypted, this encrypted decryption key is stored as the license information 16 in the second layer 13 of recording medium 11, in Step S10.

Decryption Processing of Electronic Data

Figure 6:
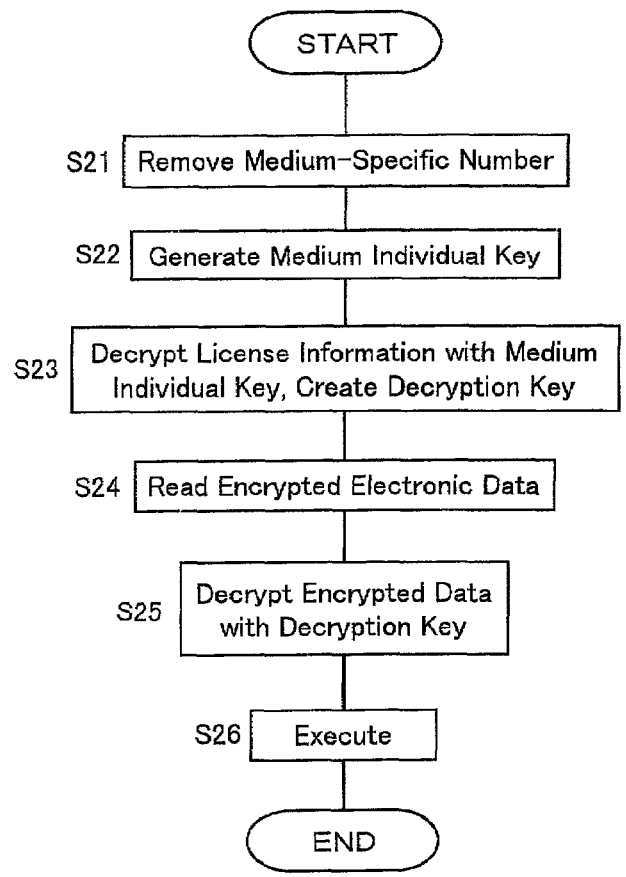
FIG. 6 is a control flow chart of the decryption processing.

Because the contents 17 stored in the third layer 14 of the recording medium 11 are encrypted by an encryption key that the licensing side has created, in order to use these contents, the user side needs to decrypt them using the appropriate decryption key. The operations at such a time will be explained using the flow chart of FIG. 6.

When the recording medium 11 has been loaded onto the drive apparatus 41 and a data load order has been given, in Step S21, the medium-specific number 15 is read out from the first layer 12 of the recording medium 11. In Step S22, an individual key is generated from the medium-specific number 15. The individual key is generated using the same algorithm as was used on the licensing side in Step S8. In Step S23, the license information 16 stored in the second layer 13 of the recording medium 11 is read out and decrypted using the individual key generated in Step S22. This decrypted license information is a decryption key for decrypting the contents 17; this decryption key is corresponded with electronic data stored in the third layer 14; this is made the decryption key table and is temporarily stored in the decryption key storage unit 44.

In Step S24, the contents 17 stored in the third layer 14 of the recording medium 11 are read. In Step S25, the read contents 17 are decrypted using the decryption key stored in the 44. In Step S26, the decrypted contents are executed.

License Information Backup Processing

Figure 7:
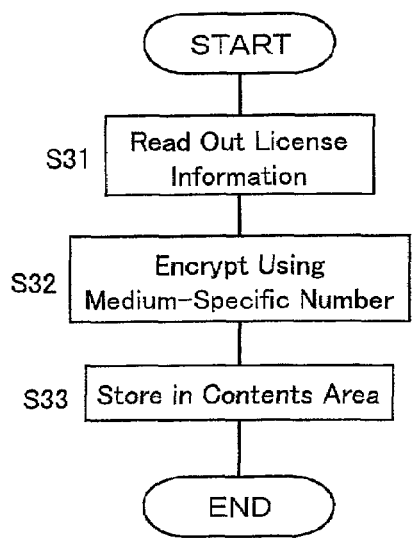
FIG. 7 is a control flow chart of the backup processing.

In the user side drive apparatus 41, the license information 16 stored in the second layer 13 of the recording medium 11 is saved as backup data. This processing will be explained with reference to FIG. 7.

In Step S31, the license information 16 stored in the second layer 13 of the recording medium 11 is read out. In Step S32, the read out license information 16 is encrypted using the medium-specific number 15. This encryption of the license information 16 can be conducted using the individual key generated in Step S22, or a constitution is possible such that the encryption is conducted using a key generated from the encryption of the medium-specific number 15 by a different algorithm. In Step S33, the encrypted license information 16 is stored in the third layer 14 of the recording medium 11.

In such a constitution, because backup data for the encrypted license information 16 has been saved, if the backup data of the third layer 14 is read out and returned to the second layer 13 when the license information 16 of the second layer 13 is lost, the contents 17 can be used without waiting for the reissue of the license information 16. In addition, because the license information saved in the third layer 14 is encrypted by the medium-specific number 15, even if what is stored in the third layer 14 of the recording medium 11 is perfectly copied, it is difficult to restore the original license information 16, thus preventing the unauthorized use of the contents 17.

Other Embodiments (A) An explanation will be given of a case where a drive apparatus that drives the recording medium 11 has the function of restoring the license information 16 using backup data of license information that has been saved in the third layer 14, when the license information 16 stored in the second layer 13 of the recording medium 11 is lost.

Figure 8:
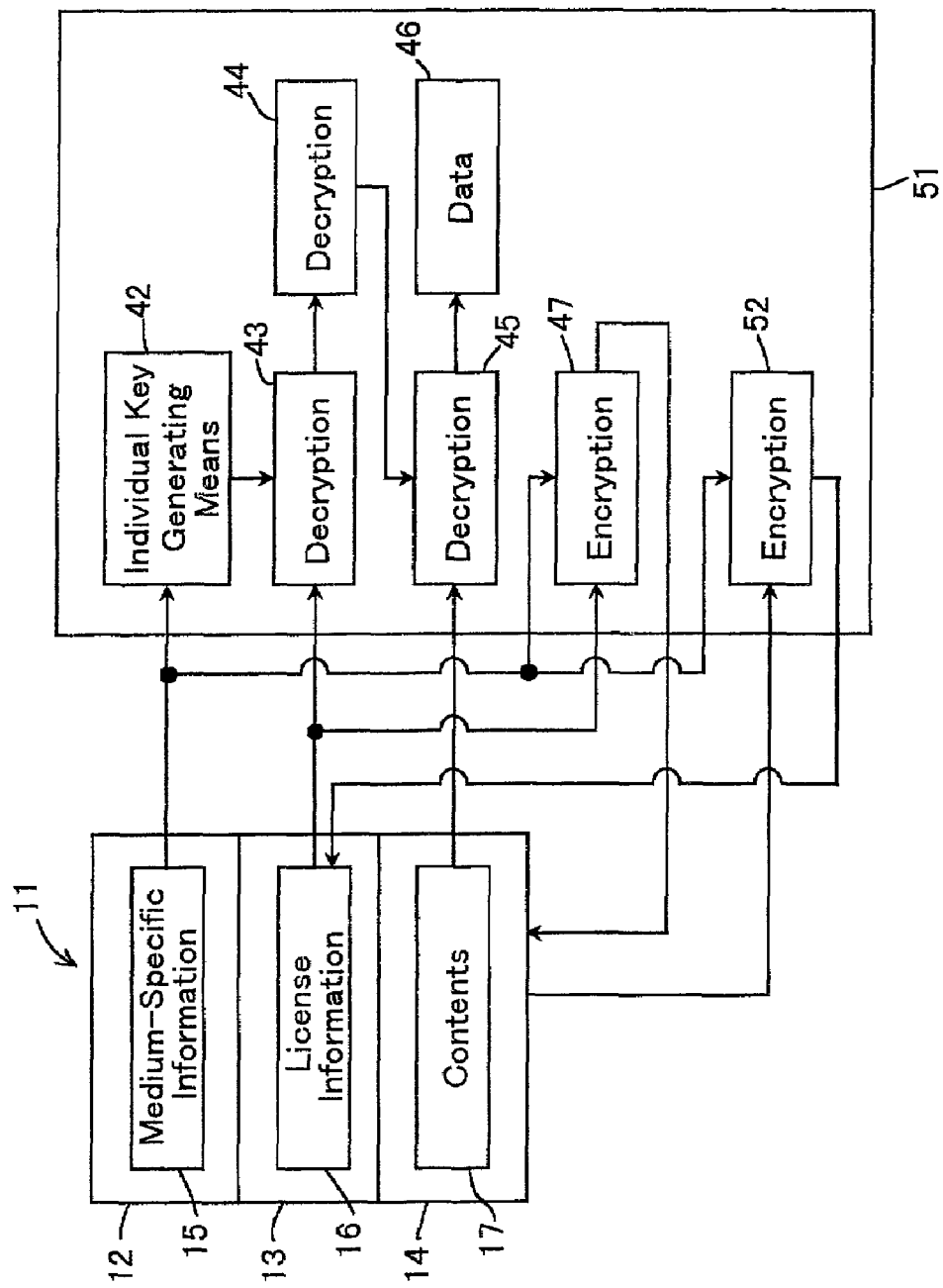
FIG. 8 is a simplified block diagram of another embodiment.

FIG. 8 is a control block diagram of a drive apparatus 51, which is such an apparatus; individual key generation means 42, license information decrypting means 43, the decryption key storage unit 44, contents decryption means 45, the decryption data storage unit 46 and license information encrypting means 47 are the same as the embodiment of FIG. 4, so the explanation thereof will not be repeated.

License information update means 52 reads out encrypted license information stored in the third layer 14 of the recording medium 11 and decrypts this using the medium-specific number 15 stored in the first layer 12. When the license information stored in the third layer 14 is encrypted by an individual key generated by individual key generation means 42, the key used in decryption will be this individual key. Then, the decrypted license information is stored in the second layer 13 of the recording medium 11 as the license information 16.

Figure 9:
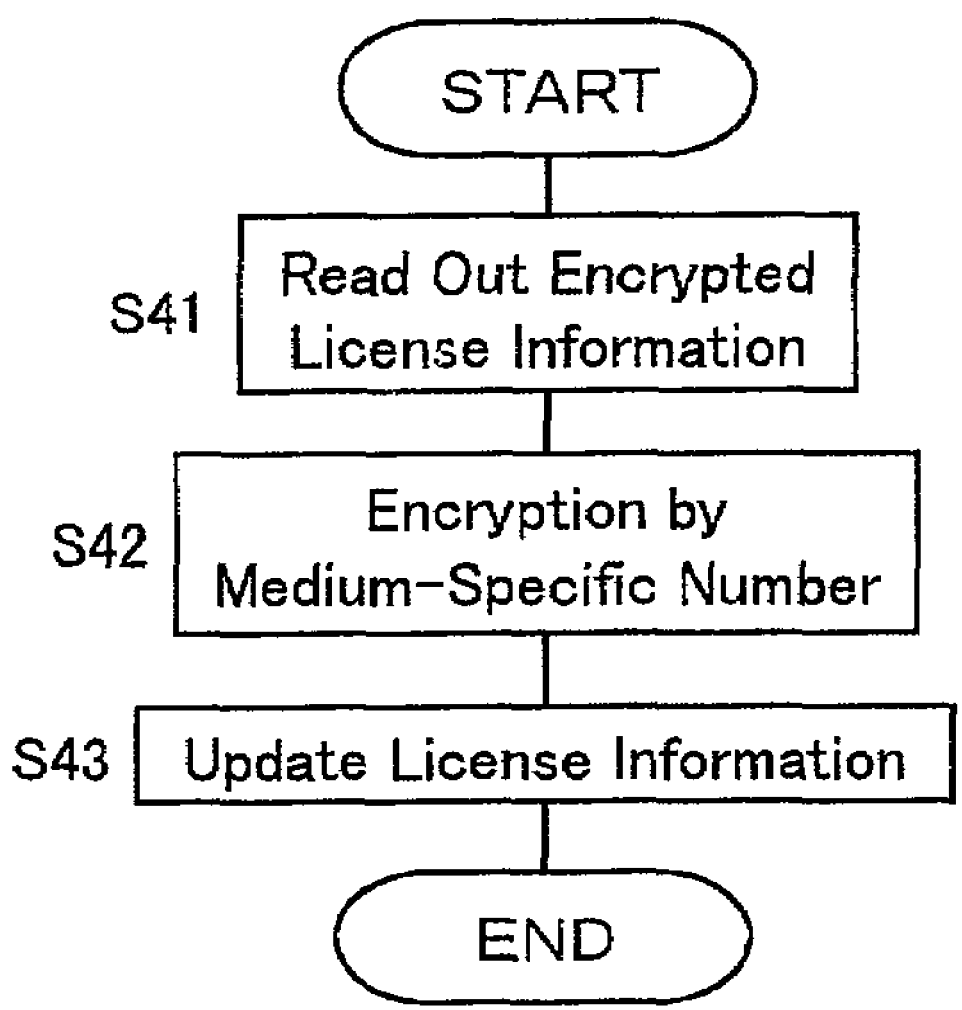
FIG. 9 is a flow chart showing license information update processing.

The operations of this embodiment are show in the flow chart of FIG. 9.

In Step S41, the encrypted license information stored in the third layer 14 of recording medium 11 is read out. In Step S42, the read out encrypted license information is decrypted by the medium-specific number 15. Here, the decryption of the license information can be conducted using an individual key generated in Step S22; when encryption has been performed using a key generated from the encryption of the medium-specific number 15, this key is used to conduct decryption. In Step S43, the decrypted license information is stored in the second layer 13 of the recording medium 11 as the license information 16.

Thus when the license information 16 stored in the second layer 13 of the recording medium 11 is lost through some kind of damage, it can be restored using the encrypted license information saved as backup data in the third layer 14. Because this restoration processing is processed within the drive apparatus 51, the license information 16 is not output externally, and the unauthorized use of this information is not possible.

Figure 10:
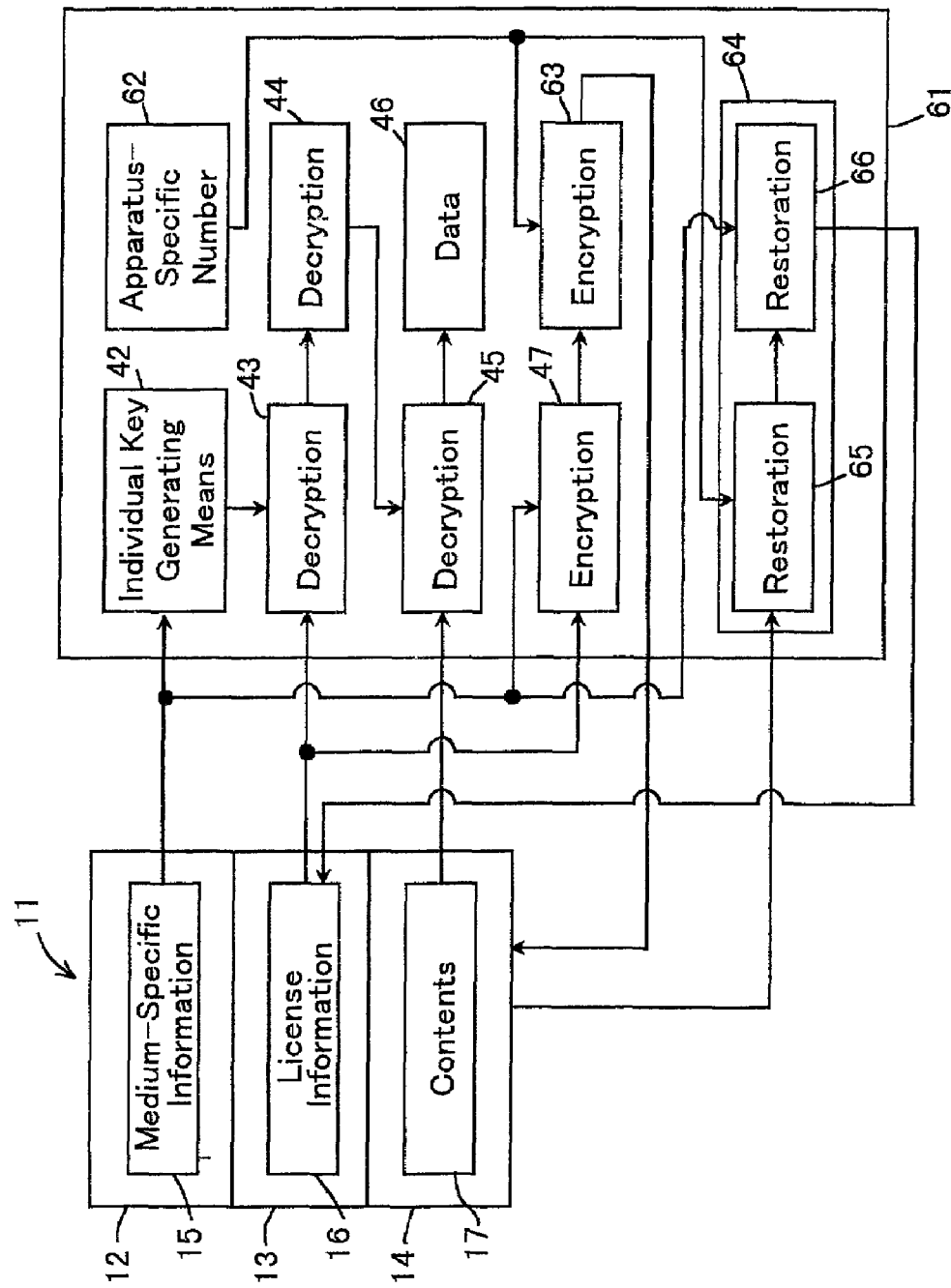
FIG. 10 is a simplified block diagram of another embodiment.
Figure 11:
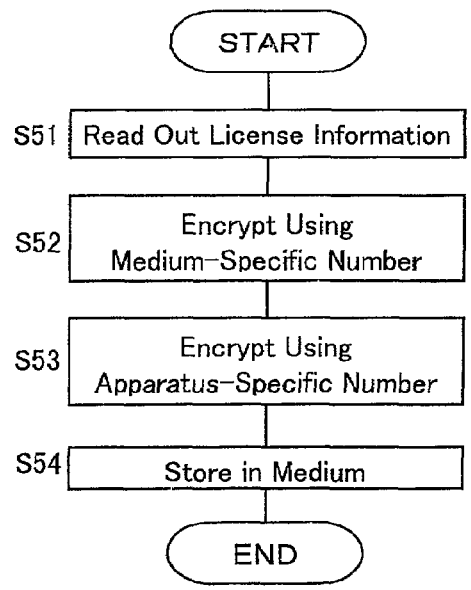
FIG. 11 is a control flowchart of the embodiment of FIG. 10.
Figure 12:
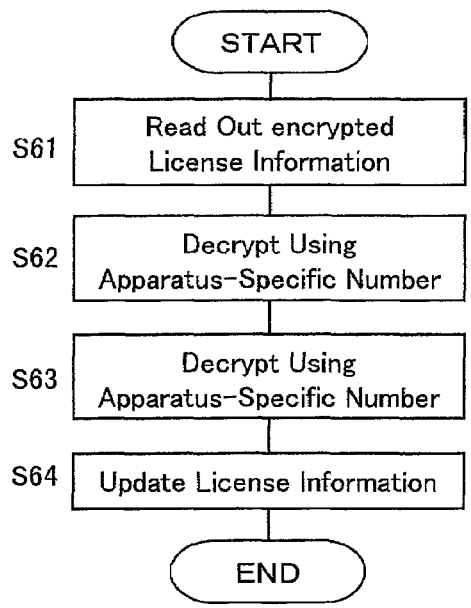
FIG. 12 is a control flowchart of the embodiment of FIG. 10.

(B) FIGS. 10 to 12 show an embodiment wherein further encryption is conducted using an apparatus-specific number specific to an apparatus for driving the recording medium 11.

As FIG. 10 shows, in a drive apparatus 61, individual key generation means 42, license information decrypting means 43, the decryption key storage unit 44, contents decryption means 45, the decryption data storage unit 46 and license information encrypting means 47 are the same as in the embodiment of FIG. 4, so an explanation thereof will not be repeated. The drive apparatus 61 further comprises an apparatus-specific number storage unit 62 that stores an apparatus-specific number. It further comprises second license information encrypting means 63. This second license information encrypting means 63 further encrypts the encrypted license information encrypted by license information encrypting means 47 using the medium-specific number 15 by using the apparatus-specific number. The license information encrypted by this second license information encrypting means 63 is stored in the third layer 14 of the recording medium 11.

In addition, the drive apparatus 61 comprises license information update means 64. This license information update means reads out encrypted license information saved in the third layer 14 of the recording medium 11; it comprises first license information restoration means 65 that decrypts this read out encrypted license information using a apparatus-specific number stored in the apparatus-specific number storage unit 62 and second license information restoration means 66 that decrypts the license information that first license information restoration means 65 has decrypted using the medium-specific number stored in the first layer 12 of the recording medium 11. The restored license information is stored in the second layer 13 of the recording medium 11 as the license information 16.

The saving of the backup of the license information 16 stored in the recording medium 11 proceeds as shown in FIG. 11.

First, in Step S51, the license information 16 stored in the second layer 13 of the recording medium 11 is read out. In Step S52, the read out license information 16 is encrypted using the medium-specific number 15 stored in the first layer 12. In Step S53, the license information encrypted by the medium-specific number 15 is encrypted by the apparatus-specific number stored in the apparatus-specific number storage unit 62. Thereafter, the encrypted license information is stored in the third layer 14 in Step S54.

When the license information 16 stored in the recording medium 11 is lost, restoration of the license information is conducted in the process shown in FIG. 12.

In Step S61, the encrypted license information stored in the third layer 14 of the recording medium 11 is read out. In Step S62, the read out encrypted license information is decrypted using the apparatus-specific number. In Step S63, the license information decrypted by the apparatus-specific number is decrypted using the medium-specific number 15. In Step S64, the decrypted license information is stored in the second layer 13 of the recording medium 11 as the license information 16.

With such a constitution, because the backup data of the license information 16 is encrypted by the medium-specific number 15 and further encrypted by the apparatus-specific number of the drive apparatus 61, even if an illegal copy of the data is made, it cannot be used, and the copyright is protected. And even if the license information 16 of the recording medium 11 is lost, it can be restored using this drive apparatus 61, and as long as the copy is authorized the contents can be used without waiting for reissue of the use rights.

The above apparatus-specific number is an apparatus number specific to the drive apparatus 61 for driving the recording medium 11, but an apparatus number specific to the computer that the user side is using can also be used. Also, when saving the backup data of the license information 16, it is possible, after it has been encrypted using the apparatus-specific number, to encrypt it with the medium-specific number 15 and store it; thus when it is to be restored, after it is decrypted using the medium-specific number 15, it is decrypted using the apparatus-specific number.

Figure 13:
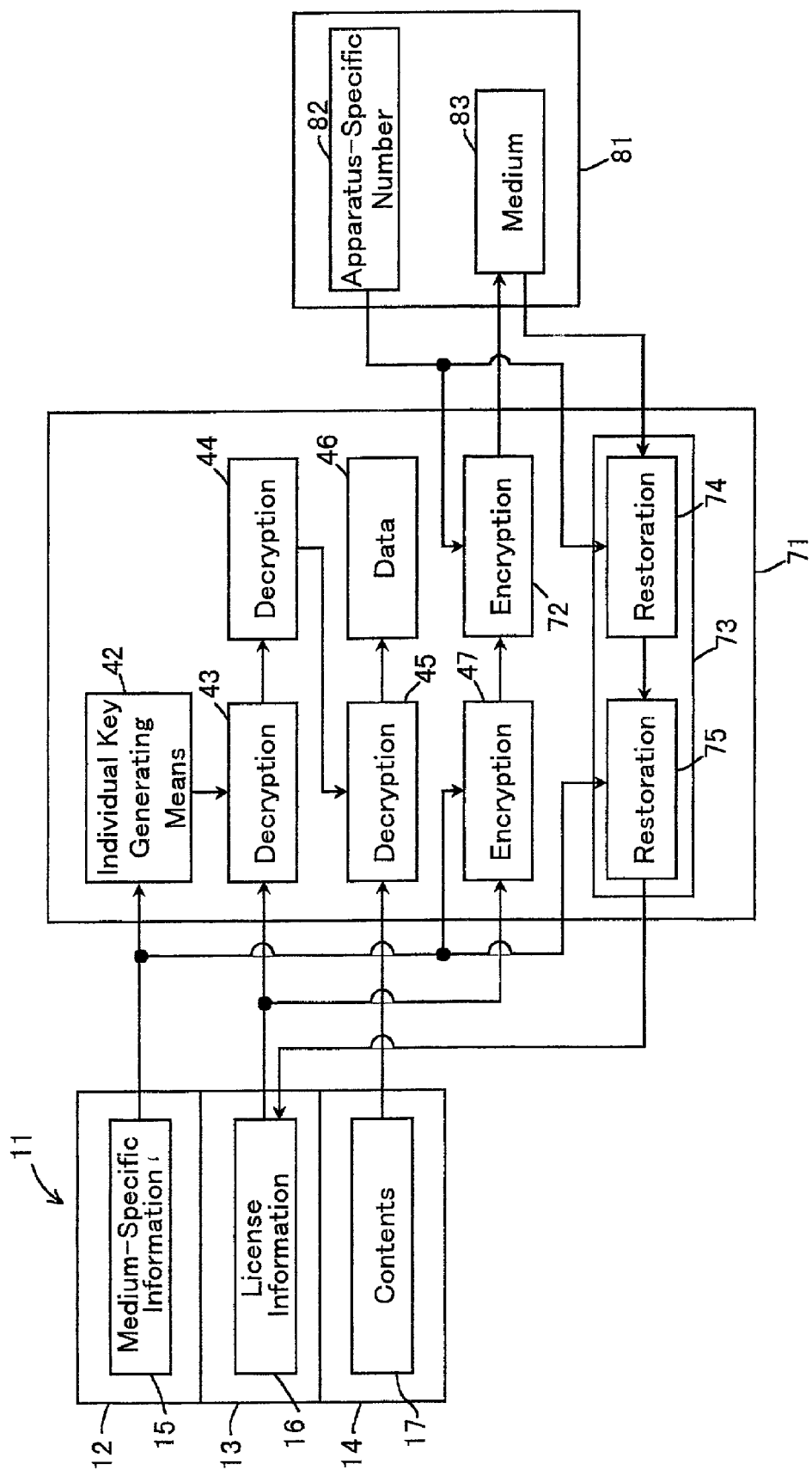
FIG. 13 is a simplified block diagram of another embodiment.

(C) Backup data of the license information 16 can also be stored in a different recording medium. An embodiment of this type will be explained while referring to FIGS. 13 to 15.

A drive apparatus 71 for driving the recording medium 11 is connected with a drive apparatus 81 for driving a second recording medium 83, and data can be exchanged between the two media. A floppy disk drive, a hard disk drive, a minidisk, a magnetooptical disk, a DVD and the like can be used as the drive apparatus 81, which comprises an apparatus-specific number storage unit 82 for storing an apparatus-specific number. This apparatus-specific number can be output as electronic data.

In the drive apparatus 71 that drives the recording medium 11, individual key generation means 42, license information decrypting means 43, the decryption key storage unit 44, contents decryption means 45, the decryption data storage unit 46 and license information encrypting means 47 are the same as in the embodiment of FIG. 4, so an explanation thereof will not be repeated. The drive apparatus 71 further comprises second license information encrypting means 72 and license information update means 73. Second license information encrypting means 72, using the apparatus-specific number of the drive device 81, further encrypts the license information encrypted by license information encrypting means 47. Thereafter, the encrypted license information is stored in the recording medium 83.

License information update means 73 reads out encrypted license information saved in the second recording medium 83; it comprises first license information restoration means 74 that decrypts this encrypted license information using an apparatus-specific number stored in the apparatus-specific number storage unit 82 and second license information restoration means 75 that uses the medium-specific number 15 stored in the first layer 12 of the recording medium 11 to decrypt the license information decrypted by first license information restoration means 74. The restored license information is stored in the second layer 13 as the license information 16 of the recording medium 11.

Figure 14:
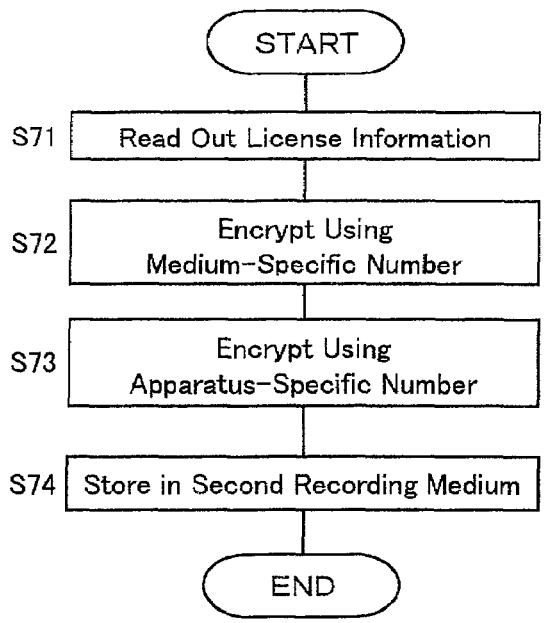
FIG. 14 is a control flowchart of the embodiment of FIG. 13.

When the backup of the license information 16 stored in the recording medium 11 is to be saved, the process shown in FIG. 14 is followed.

First, in Step S71, the license information 16 stored in the second layer 13 of the recording medium 11 is read out. In Step 572, the read out license information 16 is encrypted using the medium-specific number 15 stored in the first layer 12. In Step S73, the license information encrypted by the medium-specific number 15 is encrypted by the apparatus-specific number of the drive apparatus 81 for driving the second recording medium 83. After this, in Step S74, the encrypted license information is stored in the third layer 14.

Figure 15:
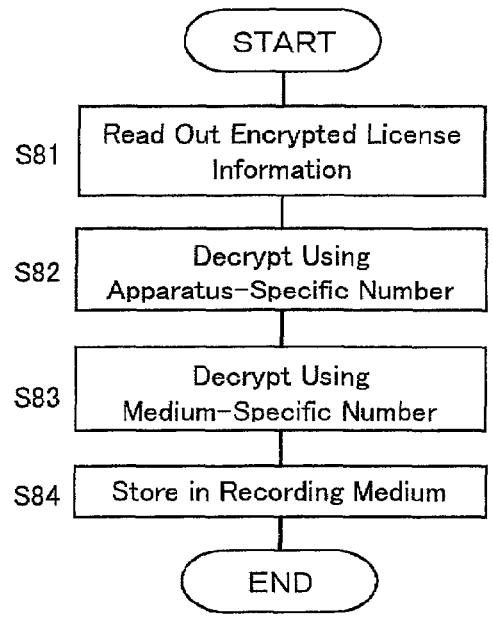
FIG. 15 is a control flowchart of the embodiment of FIG. 13.

When the license information 16 stored in the recording medium 11 is lost, the restoration processing for the license information 16 as shown in FIG. 15 is followed.

In Step S81, the encrypted license information stored in the second recording medium 83 is read out. In Step S82, the read out encrypted license information is decrypted using the apparatus-specific number of the drive apparatus 81 that drives the second recording medium 83. In Step S83, the license information decrypted by the device-specific number is decrypted by the medium-specific number 15. In Step S84, the decrypted license information is stored in the second layer 13 of the recording medium 11 as the license information 16.

With such a constitution, the backup data of the license information 16 can be managed separately from the recording medium 11, and a high level of security can be maintained. In addition, the user side can manage the license information for a plurality of recording media, and even if the license information is lost for whatever reason, the user side can handle the problem. In this embodiment, too, a constitution may be employed such that when the license information 16 is encrypted, after encrypting with an apparatus-specific number, it is encrypted with a medium-specific number. In such a case, when this license information is to be restored, it will be decrypted with the apparatus-specific number after decryption with the medium-specific number.

(D) The above method can also be applied to a case where a user records onto a recording medium encrypted data that has been broadcast over cable television, the Internet and the like. For example, the broadcast station has the user transmit a medium-specific number for the recording medium on which the encrypted data has been recorded, and it transmits to the user a decryption key encrypted with that medium-specific number. At the user apparatus, this decryption key is stored in the second layer of the recording medium as license information. Further, this license information is encrypted by a medium-specific number and stored in the third layer.

When contents on the recording medium are used, it is good to generate a decryption key by decrypting the license information using a medium-specific number and then decrypt the encrypted data. In such a case, even if the contents are copied onto a different recording medium, because the license information is encrypted with a medium-specific number, it is difficult to decrypt. Further, it is possible to restore this license information using backup data, so even if the license information is lost, the user is able to restore it.

INDUSTRIAL APPLICABILITY

With the present invention, predetermined information stored in a predetermined area of a recording medium is encrypted using medium-specific information and derived; even if that information is copied onto a different recording medium, it is difficult to decrypt it. For example, when electronic data such as software and publications is to be stored, if this electronic data is encrypted using an encryption key and then stored, and the decryption key for decrypting this is encrypted using information specific to the recording medium and stored in an area to which the user does not have access, there is no need to change the encryption key for encrypting for each individual user, as a common encryption key can be used and stored. Because the encrypted decryption key is so constituted to be further encrypted using medium-specific information and derived outside the predetermined area, a user backup copy can be saved. Because this saved backup data is encrypted using medium-specific information, it is difficult to decrypt if it is copied to another recording medium, and thus it is difficult to obtain a decryption key for decrypting the electronic data. Further, because a user can use this backup data to restore the decryption key, even if the data is lost through some kind of damage, the reissue process can be eliminated.

What is claimed is:

1. An information management method managing information of a recording medium by an information management apparatus, the recording medium having medium-specific information, and comprising a user-use area allowing writing and reading out of arbitrary information in accordance with external instructions, and a secure area that is not subject to control by external instructions, said information management apparatus having a write and read out means writing the arbitrary information to and reading the arbitrary information from said user-use area, and a predetermined information deriving means deriving the predetermined information stored in said secure area, comprising:

storing an encrypted electronic data to the user-use area of the recording medium as the arbitrary information;

storing license information based on use rights for using the encrypted electronic data stored in the user-use area to the secure area of the recording medium as the predetermined information;

deriving the license information outside said secure area of the recording medium and encrypting the license information stored in the secure area using medium-specific information or a key generated therefrom; and storing the encrypted license information to the user-use area or other recording medium;

wherein the information management apparatus encrypts and stores license information to the user-use area, decrypts the encrypted license information stored in the user-use area using the medium-specific information or a key generated therefrom, and updates the license information stored in said secure area.

2. The information management method according to claim 1, wherein said license information is encrypted using said medium-specific information or said key generated therefrom and is stored in a second area.

3. The information management method of claim 1, wherein said license information is encrypted using an apparatus-specific information or a key generated therefrom, wherein the apparatus drives said recording medium.

4. The information management method of claim 1, wherein, when said license information is to be derived outside said secure area, the information management apparatus encrypts the license information using said medium-specific information or said key generated therefrom and apparatus-specific or said key generated therefrom.

5. The information management method of claim 1, wherein if said license information is encrypted and stored in said user-use area, said license information is decrypted using said apparatus-specific information specific to an apparatus that drives said recording medium or said key generated therefrom and said medium-specific information or said key generated therefrom, and said license information stored in said secure area is updated.

6. The information management method according to claim 1, wherein said license information is encrypted and stored on a second recording medium different from said recording medium.

7. The information management method of claim 6, wherein said license information encrypted and stored in said second recording medium is decrypted using said medium-specific information or said key generated therefrom and said license information stored in said secure area is updated.

8. The information management method of claim 6, wherein, when said license information is to be derived on said second recording medium, said license information is encrypted using said medium-specific information or said key generated therefrom and apparatus-specific information specific to an apparatus that drives said second recording medium or a key generated therefrom.

9. The information management method of claim 8, wherein said license information encrypted and stored in said second recording medium is decrypted using an apparatus-specific information specific to an apparatus that drives said second recording medium or a key generated therefrom and said medium-specific information or said key generated therefrom, and said license information stored in said secure area is updated.

10. The information management method according to claim 8, wherein said apparatus-specific information specific to an apparatus that drives said second recording medium can be electronically obtained from said second apparatus and is visually displayed on said second apparatus.

11. The information management method according to claim 1, wherein said medium-specific information is electronically obtained from said recording medium and is visually displayed on said recording medium.

12. The information management method according to claim 1, wherein apparatus-specific information specific to an apparatus that drives said recording medium can be electronically obtained from said apparatus and is visually displayed on said apparatus.

13. The information management method according to claim 1, wherein a second area outside the secure area is external to the recording medium.

14. An information management apparatus using a medium having medium-specific information, and comprising a user-use area allowing writing and reading out of arbitrary information in accordance with external instructions and a secure area that is not subject to control by external instructions, said information management apparatus managing information of a recording medium wherein license information based on use rights for said arbitrary information stored in a user-use area is stored in said secure area, said information management apparatus comprising:

write and read out means writing said arbitrary information to and reading said arbitrary information from said user-use area; and predetermined information deriving means encrypting said license information stored in said secure area using said medium-specific information or a key generated therefrom, deriving said encrypted license information outside said secure area and storing the encrypted license information in the user-use area of the recording medium or another recording medium;

wherein said license information is encrypted and stored by said write and read out means in said user-use area.

15. The information management apparatus of claim 14, further comprising predetermined information update means decrypting said license information encrypted and stored in said user-use area using said medium-specific information and updating said license information stored in said secure area.

16. The information management apparatus according to claim 14, comprising apparatus-specific information, wherein said predetermined information deriving means encrypts said license information using said medium-specific information or said key generated therefrom and said apparatus-specific information specific to the apparatus or a key generated therefrom.

17. The information management apparatus of claim 16, further comprising predetermined information update means decrypting said license information encrypted and stored in said user-use area using said apparatus-specific information or said key generated therefrom and information specific to said apparatus or a key generated therefrom and said medium-specific information or said key generated therefrom and updating said predetermined information stored in said secure area, if the license information is encrypted and stored in said user-use area.

18. The information management apparatus of claim 14, wherein said predetermined information deriving means transmits said encrypted license information to a second recording medium different from said recording medium.

19. The information management apparatus of claim 18, further comprising predetermined information update means decrypting said license information encrypted and stored in said second recording medium using said medium-specific information and updating said license information stored in said secure area.

20. The information management apparatus of claim 18, wherein an apparatus that drives said second recording medium comprises apparatus-specific information and said predetermined information deriving means encrypts said license information using said medium-specific information or said key generated therefrom and information specific to the apparatus that drives said second recording medium or a key generated therefrom.

21. The information management apparatus of claim 20, further comprising predetermined information update means decrypting said license information encrypted and stored in said second recording medium using the apparatus-specific information specific to an apparatus that drives said second recording medium or said key derived therefrom and said medium-specific information or said key generated therefrom and updating said license information stored in said secure area.

22. The information management apparatus according to claim 14, wherein the area outside the secure area is external to the recording medium.

* * * * *

UNITED STATES PATENT AND TRADEMARK OFFICE
CERTIFICATE OF CORRECTION

PATENT NO. : 7,325,247 B2 Page 1 of 1
APPLICATION NO. : 09/800505
DATED : January 29, 2008
INVENTOR(S) : Seigo Kotani et al.

It is certified that error appears in the above-identified patent and that said Letters Patent is hereby corrected as shown below:

On the Title Page, above item (57) (Primary Examiner), change "Rambiz" to

--Kambiz--.

Signed and Sealed this

Second Day of September, 2008

JON W. DUDAS
*Director of the United States Patent and Trademark Office*